United States Patent [19]

Moore, Jr.

[11] 3,932,731

[45] Jan. 13, 1976

[54] CODE CONVERTER

[75] Inventor: Glenn Ellis Moore, Jr., Murray Hill, N.J.

[73] Assignee: Bell Telephone Laboratories, Incorporated, Murray Hill, N.J.

[22] Filed: Feb. 27, 1975

[21] Appl. No.: 553,528

Related U.S. Application Data

[63] Continuation-in-part of Ser. No. 494,031, Aug. 2, 1974.

[52] U.S. Cl........ 235/61.11 D; 235/61.7 B; 360/113
[51] Int. Cl.² ... G06K 7/08; G06K 5/00; G11B 5/30
[58] Field of Search .............. 235/61.11 D, 61.7 B; 360/113; 325/38 A, 38 R; 340/149 A

[56] References Cited

UNITED STATES PATENTS

| 3,708,748 | 1/1973 | Nassimbene | 325/38 R |
| 3,763,351 | 10/1973 | Deerhake | 235/61.11 E |

OTHER PUBLICATIONS

Hunt, A Magnetorestrictive Readout Transducer, IEEE Transactions on Magnetics, Vol. 7, No. 1, Mar., 1971 pp. 150–154.

Primary Examiner—Daryl W. Cook
Attorney, Agent, or Firm—H. M. Shapiro

[57] ABSTRACT

A bit stream encoded in the Aiken or similar self-clocking code is converted into binary waveform with clocking by a sensor including two sensor elements spaced apart a critical distance. The elements read the bit stream independently. A logic circuit responsive to the outputs of the elements determines the data content of each bit as well as the timing of that bit.

The apparatus permits code conversion of, for example, credit cards at point of sale (POS) apparatus independent of variations in the movement of the code (viz: credit card) with respect to the sensor.

14 Claims, 17 Drawing Figures

CODE CONVERTER

CROSS REFERENCE TO RELATED APPLICATION

This application is a continuation-in-part of my copending application, Ser. No. 494,031 filed Aug. 2, 1974.

FIELD OF THE INVENTION

This invention relates to code conversion apparatus, and, more particularly, to such apparatus responsive to each bit of a stream of signal bits to convert that stream into two bit streams, one containing data and the other containing timing information.

BACKGROUND OF THE INVENTION

Various self-clocking encoding schemes have been devised in which a signal containing both data and timing information is represented by a single binary bit stream. Ideally, such a stream is represented as at least two possible levels or states characterized by transitions between the states. If a magnetic medium is used for storage of the bit stream, the data and timing information is represented, for example, either by a series of transitions between distinct magnetization states or graphically by a bar code of permanent magnetic material.

The bar code is frequently used in credit cards. One accepted encoding scheme of this type is called the "Aiken" code. The Aiken code is characterized electrically by transitions between two possible signal levels which transitions occur regularly at the beginning and end of each bit interval bar or cell length. The code is also characterized by the presence or absence of an "irregular" transition occurring intermediate the regular transitions indicating first and second output data states representing, say, a binary one and a binary zero, respectively. The data contained in such a code thus is represented by the irregular transitions and the timing information is represented by the regular transitions.

The Aiken code typically is converted into another format for processing. One such format is a binary waveform with clocking. To accomplish this conversion, a decoder is required to generate a data bit stream which is characterized by a first level representing a binary one and a second level representing a binary zero. But a second or timing bit stream is employed to interpret the data bit stream. Thus, the regular and irregular transitions are separated one from the other.

Prior art decoders operative to perform the above-described conversion are relatively simple to implement if the Aiken code is read at a uniform rate. For example, an accurate clock or timer can be used to determine the proper time within a bit cell to check for the presence or absence of an irregular transition. If, on the other hand, the Aiken code is read or scanned at a nonuniform rate, as would be the case where a hand operated reader is used, a clock is of little use, and another approach is generally required.

One known approach for reading (optical) codes at a nonuniform rate may, for example, utilize the spatial width of the preceding bit as a basis for establishing an appropriate viewing window for the present bit. By so doing, the decoder can still function properly despite moderate changes in reading speed between adjacent bits. But, this type of procedure requires relatively complicated and costly logic circuitry, and does not operate properly under certain reading conditions involving acceleration and deceleration. Moreover, with codes of constant cell size such as the Aiken code such a procedure cannot be used.

SUMMARY OF THE INVENTION

The present invention is based on the recognition that two sensor elements spaced one-half cell length apart provide, in response to the bits of a signal stream, independent outputs which when applied to simple logic circuitry provide separate representations of the data and the timing information. The logic circuitry includes decisional circuitry responsive to outputs from the two elements for generating an output stream containing timing information. The timing information in conjunction with the outputs of both of the sensor elements is used to generate a separate output stream containing data.

In a preferred embodiment, a pair of magnetoresistive sensor elements are spaced one-half cell length apart in the path of the code. Each element responds independently to the regular transitions at the beginning and at the end of a cell and also to the irregular transitions (data information) stored in the center of the cell. Due to the spacing between elements, an output is received from the two elements simultaneously only when a data bit (a binary one) is stored. Only one element is activated when no data bit (a binary zero) is stored. The electronic output is independent of the speed at which the code passes the sensor.

A simple electronic circuit processes the outputs of the two elements typically for transmission to a remote computer. The outputs are applied to an OR circuit, the output of which is employed both to enable the data from the elements to be applied (via an AND gate) to a shift register and to provide a clock pulse for the shift register. The operation provides enabling pulses with widths reflective of the movement of the credit card and the effect is that the output from at least one of the elements is stored in the shift register whenever the corresponding bits of the code arrive at the sensor.

The operation depends on the close proximity of the elements to one another. In order to achieve the desired proximity, magnetoresistive sensor elements are formed by photolithographic techniques and are connected electrically in parallel to provide independent indications of the code as required. The constraint on the magnetoresistive elements impose design criteria embodied in a novel approach herein. Each element, for example, includes a plurality of subelements having a prescribed growth or shape anisotropy. The subelements are connected electrically in series and respond to the presence of a transition of the code by the rotation of the magnetization therein.

It is considered that a sensor utilizing two magnetoresistive elements in parallel to develop simultaneous outputs indicative of the stored code, in combination with the electronics for providing data representative of the code represent novel features of the present invention.

DETAILED DESCRIPTION

Figures 1, 2, 3, 4:
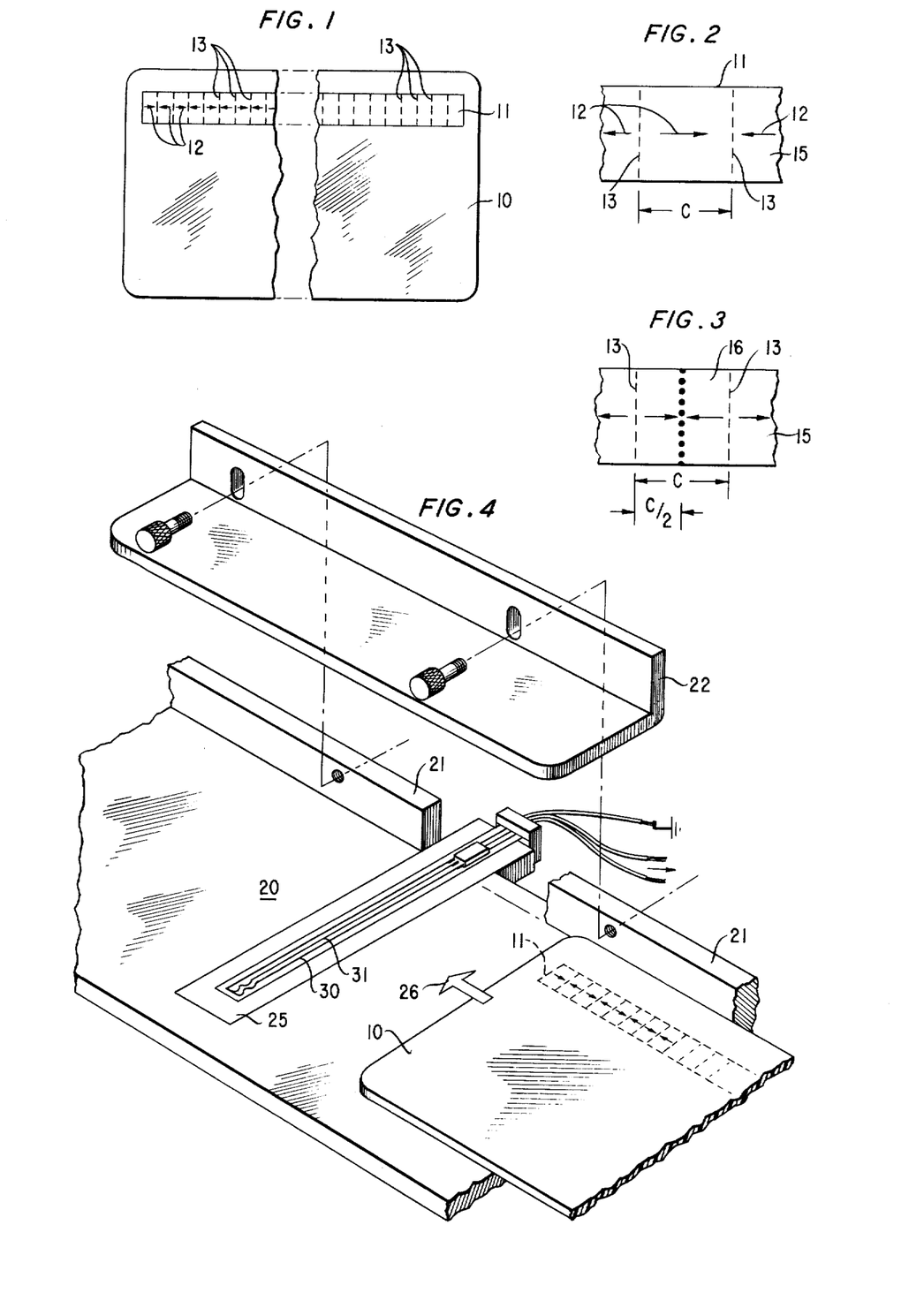
FIG. 1 is a top view of a conventional credit card of a kind for reading in accordance with this invention.
FIGS. 2 and 3 are magnified top views of portions of the magnetic tape of the credit card of FIG. 1 showing magnetic states therein.
FIG. 4 is a fragmentary projection view of a sensor arrangement for reading the credit card of FIG. 1 in accordance with this invention.

FIG. 1 shows a typical plastic credit card 10 which bears an elongated magnetic tape 11. The tape includes a series of bars each forming a separate cell. In the absence of recorded information, the successive cells are magnetized in alternating directions along the axis of the tape as indicated by the oppositely directed arrows 12 in the figure. Each interface between a pair of oppositely magnetized cells is indicated by a broken line 13 normal to the axis of the tape. Each broken line corresponds to a change (or transition) in the magnetization direction within the tape.

FIG. 2 shows a section of tape 11 in an enlarged view. The arrows 12 indicate three separate cells defining two adjacent transitions 13. These transitions occur at regular intervals along the tape and define a constant cell length C therebetween. Data information is stored in a cell by including in the center of the cell a reversal in the direction of magnetization. FIG. 3 shows such an additional transition in the center of a representative cell defined by a pair of adjacent broken lines 13. This transition divides a cell into two regions and represents a data bit (viz: a binary one). The irregular transition is represented in the figure by a dotted vertical line as viewed. Note that the magnetization in regions 15 and 16 of FIG. 3 are reversed from the directions shown for these regions in FIG. 2 in order to store the data bit and to still maintain the end-of-cell transition. Apparatus to code credit cards of this type in this manner is in common use and is operative normally to so maintain the cell length constant.

FIG. 4 shows code conversion apparatus (a credit card reader) in accordance with one embodiment of this invention for reading a credit card bearing a magnetic tape coded as described in FIG. 1, 2, and 3. The card is placed, tape down, against a surface 20 and abutting a guide 21. Typically the card is inserted in a slot defined by surface 20 and a plate 22 secured to guide 21 to press the card against surface 20. FIG. 4 also shows magnetoresistive sensor apparatus 25 inserted into the surface 20 and level therewith. Apparatus 25 is responsive to the transitions of tape 11 as the card is moved to the left as indicated by arrow 26 in the figure. Plate 22, in pressing card 10 against surface 20, ensures close proximity between the tape and the sensor apparatus to provide suitable output signals from that apparatus.

Figure 5:
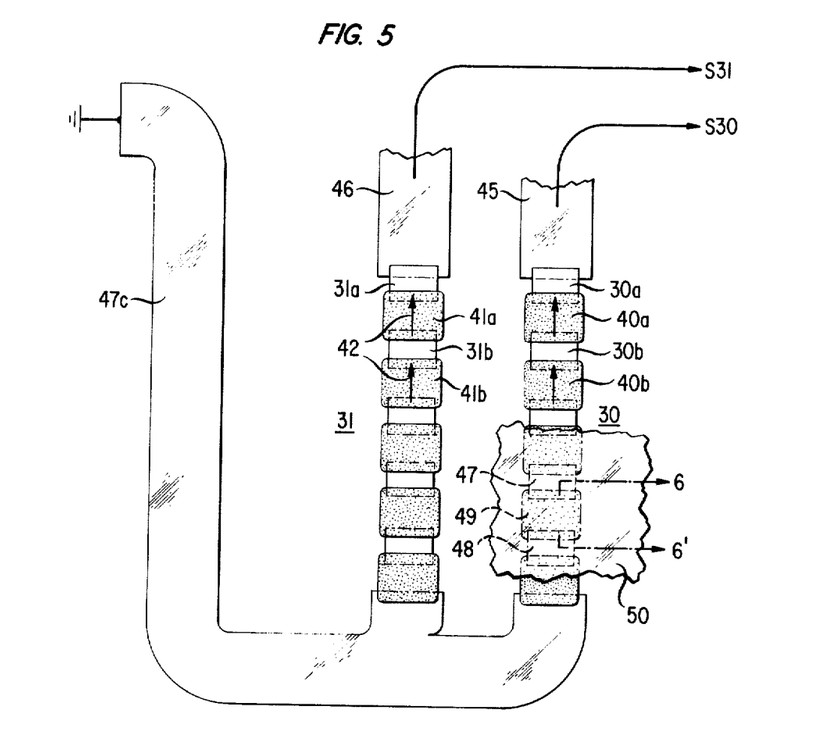
FIGS. 5 and 6 are magnified top and cross-sectional views of the sensor arrangement of FIG. 4.
Figure 6:
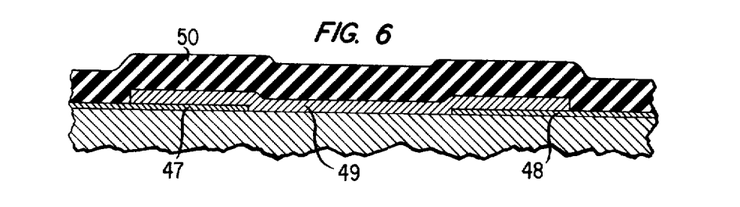
Figure 7:
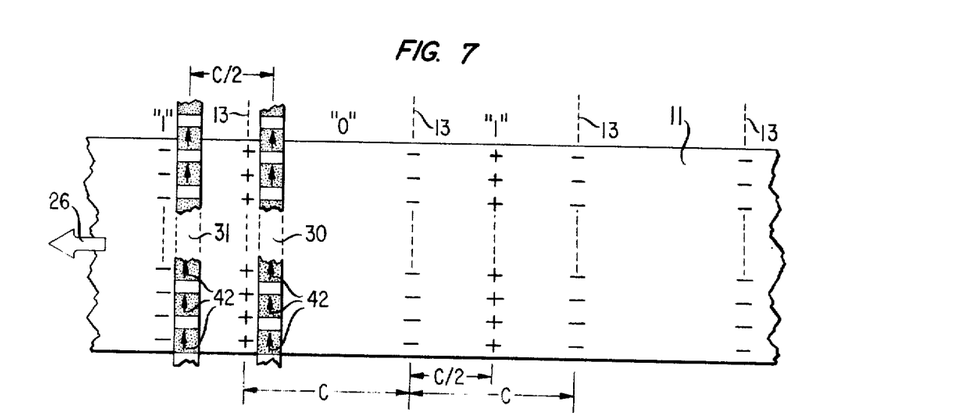
FIG. 7 is a schematic representation of the sensor arrangement of FIG. 4 in relationship with the credit card tape of FIG. 1.

The sensor apparatus includes first and second magnetoresistive elements 30 and 31 astride the path along which tape 11 moves. FIGS. 5, 6, and 7 show the details of those elements along with the relationship of the elements to the magnetic states of tape 11. The magnetoresistive elements are shown in detail in FIG. 5 to include subelements 30a, 30b...and 31a, 31b...interconnected by electrical conducting elements 40a, 40b..., and 41a, 41b..., respectively, into a string of subelments. Each subelement is either deposited so that its magnetization is directed upwards as viewed in FIG. 5 and indicated by arrows 42 there or deposited in a shape such that magnetization in the illustrative preferred direction upwards is ensured. The strings of subelements are connected between conductors 45 and 46 and ground (via conductor 47) as shown in FIG. 5.

FIG. 6 shows a cross section of adjacent magnetoresistive subelements of element 30 taken along line 6—6' of FIG. 5. The two magnetoresistive subelements (of magnetically soft permalloy) are designated 47 and 48 with the interconnecting conducting subelement designated 49 in FIGS. 5 and 6. An oxide coating 50 covers the (metallic) conducting subelement, bringing the sensing apparatus into the plan of surface 20 and acting as a protective coating. Typically the magnetoresistive subelements are $2 \times 10^{-3}$ (or 2 mils) $\times 2 \times 10^{-2} \times 4 \times 10^{-6}$ inches thick, the conducting subelements are $2 \times 10^{-3} \times 2 \times 10^{-3} \times 6 \times 10^{-5}$ inches thick and 5 subelements are present in each sensor element. Each sensor element develops a signal of 4 millivolts with a current of 3 milliamperes in response to a typical transition in tape 11. The width of each element is dimensioned to compensate for variations in spacings between the transitions on the tape (typically ±4 percent).

FIG. 7 shows sensor elements 30 and 31 astride tape 11. Consecutive (regular) transitions 13 in the tape are identified in FIG. 7 as a vertical array of positive (+) or negative (−) signs. The presence and absence of (irregular) transitions are further identified by the information content (viz: binary "1" and binary "0", respectively) represented thereby. The presence of + signs near sensor 30, can be understood to rotate the magnetization into alignment with the axis of tape 11 resulting in a signal S30 in element 30. The presence of (−) signs at element 31, at this time, also causes a rotation of the magnetization of the subelements of that element again causing a signal S31 in response to currents flowing therein. Signals S30 and S31 are indicated in FIGS. 5 and 8.

Figure 8:
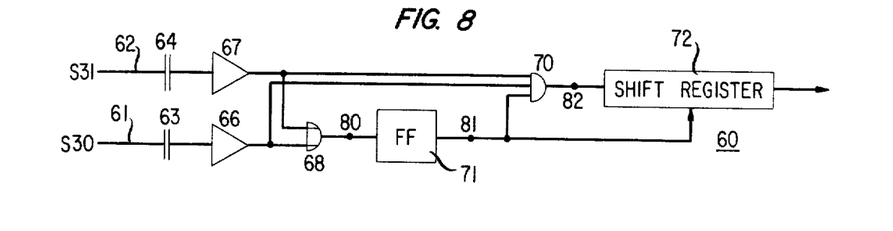
FIG. 8 is a schematic representation of a circuit for processing the outputs of the detector arrangement of FIG. 2.
Figure 9:
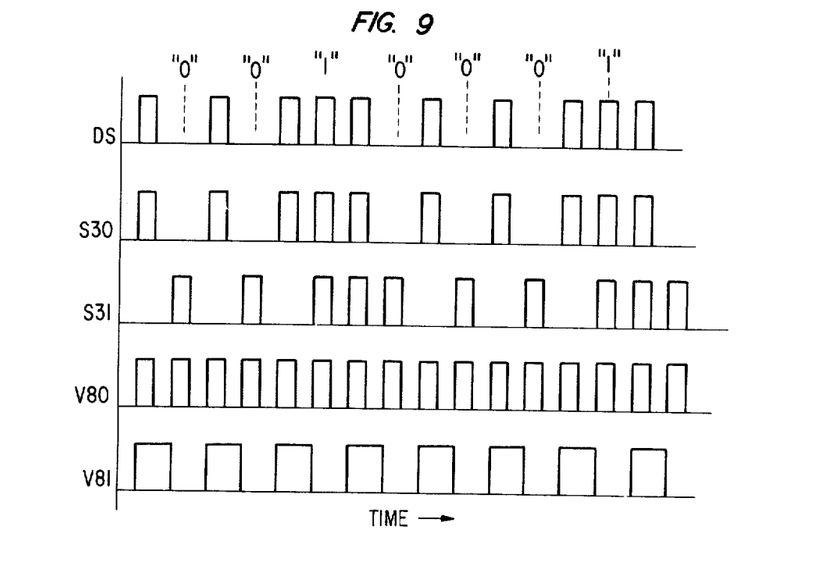
FIGS. 9, 10, and 11 are pulse diagrams of the operation of the circuit of FIG. 8.
Figure 10:
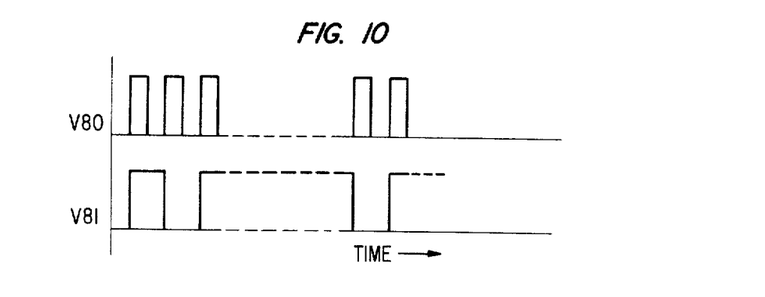
Figure 11:
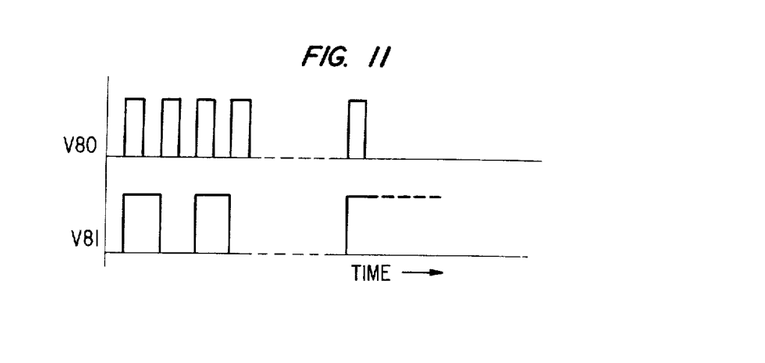

FIG. 8 shows a block diagram of an illustrative electronic circuit 60 to which signals S30 and S31 are applied to produce the operation summarized by the pulse diagrams of FIGS. 9, 10, and 11. Circuit 60 includes first and second input lines 61 and 62 to which signals S30 and S31 are applied respectively. These lines are connected via capacitors 63 and 64 to inputs to amplifiers 66 and 67 respectively. The output of amplifier 66 is connected to an input of OR circuit 68 and to an input of AND circuit 70. The output of amplifier 67, similarly, is connected to an input of OR circuit 68 and an input of an AND circuit 70. The output of OR circuit 68 is connected to the input of a flip-flop 71. The output of flip-flop 71 is connected to an input of AND circuit 70 and to a clock input of shift register 72. The output of AND circuit 70 is connected to the data input of register 72.

In operation, circuit 60 of FIG. 8 is responsive to simultaneous outputs from elements 30 and 31 to gate a data bit into register 72. The capacitors 63 and 64 and amplifiers 66 and 67 serve only to square the signals generated by the detection of a transition in tape 11 and to provide logic level signals as is indicated by the pulses in FIG. 9. If we consider a (coded) data stream (DS) represented by the pulse form on the top line of FIG. 9, generated as card 10 moves to the left in FIG. 4, the waveform of the second line from the top in FIG. 9 represents the signals S30 generated at element 30 and the waveform of the third line represents the signals S31 generated at element 31. The waveforms representing signals S30 and S31 can be seen to be identical, but displaced, with respect to one another, in time as can be seen from the figure as is expected from the physical layout of the sensor elements in FIG. 5.

The circuit responds to the pulses from the two sensor elements to provide a pulse train V80 at point 80 in FIG. 8 and shown in FIG. 9. This pulse train is applied to flip-flop 71. The flip-flop responds to apply to register 72 to a two-level signal, shown as V81 in FIG. 9. Note that signal V81 remains at a given level until a pulse (V80) occurs to change that level. If the credit card is moved at different speeds, this merely produces longer pulses in signal V81 as indicated in FIGS. 10 and 11. FIGS. 10 and 11 illustrate the situations where the code is moved more slowly, or stopped, in the middle of a cell for the case where signal V81 is at an enabling level and not at an enabling level respectively. Whenever an end-of-cell transition generates a pulse (S30) a beginning-of-cell transition is positioned to generate a pulse (S31), therefore the credit card cannot be stopped between cells in the present system.

It may be noted also from FIG. 9 that consecutive simultaneous outputs from the elements occur when a binary one is stored and that only one of these occurs when V81 is at a level to enable AND gate 70. Signal V81 is also applied to shift register 72 as is the output of AND circuit 70. The signal (V81) serves a clocking pulse to advance shift register 72 one stage each time the signal is at the enabling level for enabling storage of the next subsequent data bit.

As long as the sensor elements are spaced apart one-half cell length, the same number of transitions will occur first at one sensor element then at the other. If the one-half cell length spacing is not observed, then a memory has to keep track of the difference between the numbers of transitions sensed at the two sensor elements. A code conversion system employing memory to this end is disclosed in copending application Ser. No. 494,030 filed Aug. 2, 1974 for D'Orazio and Soloway now U.S. Pat. No. 3,898,689.

It is to be understood that it is not necessary herein to employ shift register 72 of FIG. 8 to store information for later use. The information instead may be transmitted directly to, for example, a computer for processing. In such a case, signal V81 serves as a framing signal for transmission rather than as a clocking signal for storage.

The interconnection of both of amplifiers 66 and 67 to AND circuit 70 avoids some practical problems of interconnection. For example, if only one amplifier is connected to AND circuit 70, and the element connected to the other amplifier senses data first, the system could respond to record all binary ones. This result is avoided by changing the connections or by color coding the wires to avoid improper connection in the first place. If both amplifiers are connected to circuit 70 as shown in FIG. 8, the element may be connected so that either element detects the data first and operation occurs as described. The importance of the half-cell spacing between the sensor elements in obviating the necessity for memory to keep track of the difference between data bits detected at the two elements herein is now clear. But the realiziation of such an arrangement depends on being able to physically space the elements as required. The physical separation between the normal transitions in a tape of a credit card is from 2.5 mils to about 6 or 7 mils. Thus, the spacing between elements, center to center is about six to seven mils. These dimensions are well within the capabilities of common photolithographic techniques employed to form the elements.

In practice, the elements were formed in one instance by depositing a string of five islands of permalloy 1000 Angstroms thick and each about twenty mils long and two mils wide (about 40 mils square in surface area) through a mask by such photolithographic techniques. Islands of gold were similarly deposited to a thickness of 13,000 Angstroms to interconnect the permalloy islands into the geometry shown in FIG. 5. The structure was then coated by an oxide ($SiO_2$) layer having a thickness of one micron. The permalloy elements exhibited a shape anisotropy in this instance such that a field of 20 oersteds parallel to the tape motion saturated the sensor elements. The flux available from the tape in the credit card exceeded 20 oersteds for sensor elements within 0.002 inch of the tape.

The formation of the sensor elements by a string of subelements is to achieve a structure with a sufficiently low demagnetization field to allow rotation of the magnetization of the elements by the data bits in order to get an output. Each subelement exhibited a demagnetizing field of about 20 oersteds which is satisfactory for detection and yet is unaffected by stray magnetic fields. Each sensor element exhibited an output of about four millivolts in response to a current of three milliamperes. The resistance of each element was about one hundred ohms and the change in resistance (magnetoresistance) was about 1.3 percent.

The use of magnetoresistive subelements of square or circular surface geometry requires that anisotropy be provided by processing. Such processing is well understood in the art.

The embodiment described hereinbefore is directed to the detection of a tape on a credit card which includes a single track (track II above) of information. Credit cards in common use have several tracks of information, typically three. The first track has the IATA (International Air Transport Association) code with a density of 210 bits per inch. The second track has the ABA (American Banking Association) code with a density of 75 bits per inch. The second track is used most commonly and it is in connection with the detection of this track that the above illustrative embodiment is described.

The code in track II is strictly a numeric code and it is becoming increasingly important to use alphanumerics so that the name of the card bearer can be coded and related directly to his transactions. Track I has an alphanumeric code and is used, for example, in reservation systems at air terminals. A card reader capable of reading more than one track of a credit card, of course, would be quite desirable.

The arrangement of FIGS. 1 through 7 can be adapted for sensing one or both (or more) of the tracks on credit cards by defining on a single sensor head a parallel arrangement of sensor element pairs each with a spacing equal to one-half the cell length of the code on the track with which it is associated.

Figure 12:
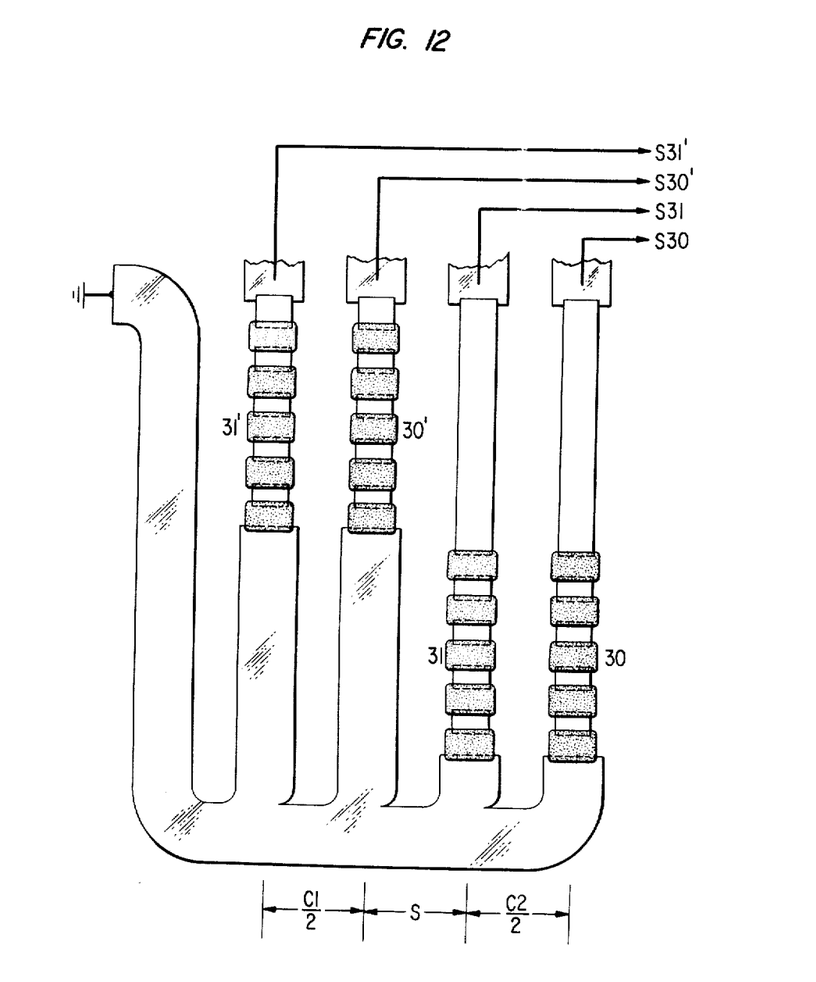
FIGS. 12 and 16 are magnified top and cross-section views of an alternative sensor arrangement in accordance with the principles of the invention.
Figure 13:
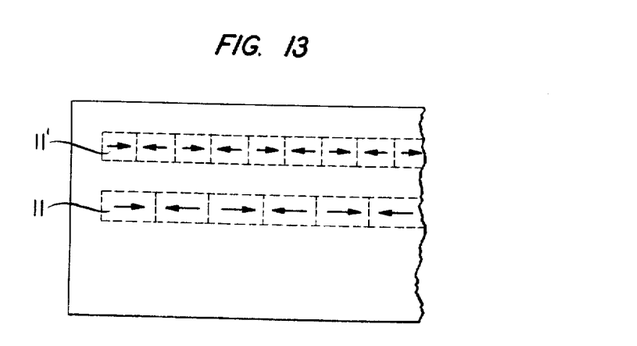
FIG. 13 is a top view of a credit card for detection with the sensor arrangement of FIG. 12.

An arrangement for the sensing of two tracks is illustrated in FIG. 12. The figure shows an arrangement of a pair of sensor elements 30 and 31 related to the sensing of say track II with a spacing of C1/2 as indicated in the figure. This portion of FIG. 12 is exactly as described in FIG. 5 and is designated in a corresponding manner. FIG. 12 also shows a pair of sensor elements 30' and 31' spaced apart C2/2 as indicated in the figure. The active portion of sensor elements 30' and 31' is physically displaced with respect to element 30 and 31 to correspond to the separation between tracks on a credit card and is associated with track I. This relationship is understood by a consideration of FIG. 13 where tracks II and I are illustrated, respectively, by indications 11 and 11' (see item 11, FIG. 4).

In the simplest arrangement to be described, the outputs of each pair of sensor elements are applied separately to associated electronics each as shown in FIG. 8. But in practice, it is less expensive to employ a single set of electronics, with a suitable switching arrangement, conveniently with a separation S between pairs of sensor elements, as shown in FIG. 12, sufficient to allow the electronics time to determine which track is encoded.

Figure 14:
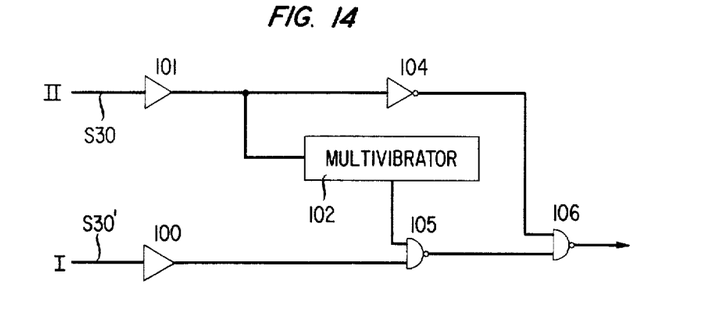
FIGS. 14 and 15 are circuit diagrams of a switching arrangement for use with the sensor arrangement of FIG. 12.
Figure 15:
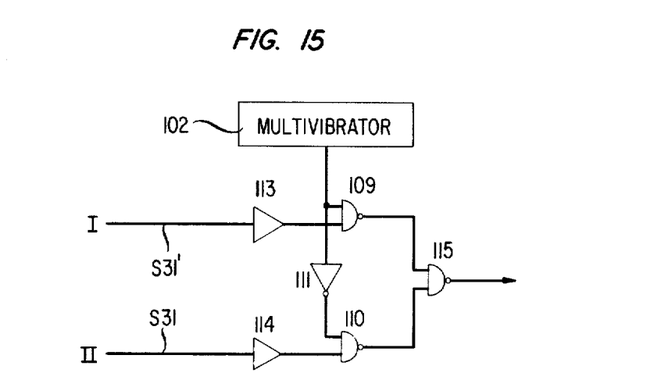

FIGS. 14 and 15 show a switching arrangement which applies the signals from one of a plurality (two) of pairs of sensor elements which corresponds to a track of a credit card which has been encoded. FIG. 14 shows a portion of the arrangement which responds to a signal from one sensor element of each of the pairs of sensor elements corresponding to tracks I and II. The portion to be more specific comprises amplifiers 100 and 101 to the input terminals of which signals are applied from one sensor element associated with each of tracks I and II, respectively. The output of amplifier 100 is connected to an input to a retriggerable multivibrator 102 and to an input to an inverter 104. The outputs of amplifier 100 and multivibrator 102 are connected to inputs to NAND circuit 105. The outputs of inverter 104 and NAND circuit 105 are connected to inputs to NAND circuit 106.

In operation, raw signals associated with tracks I and II are amplified to logic levels by amplifiers 100 and 101, respectively. Only one signal from one sensor of each pair is looked at. One of two conditions exists:

1. Data is Present on Track II

In this case the multivibrator is triggered by the first data pulse from track II. The output of the multivibrator, initially at a high voltage, goes low. In turn, one input to NAND circuit 105 goes low, thus blocking the input of data from track I. The output of NAND circuit 105 is now in a high condition thus enabling NAND circuit 106 allowing data from track II to pass, via inverter 104, directly to the decode electronics.

2. Data is Not Present on Track II

In this instance multivibrator 102 is not triggered and its output remains at a high voltage value. NAND circuit 105 is thus enabled allowing the inverted data from the track I sensor element to be applied to NAND circuit 106. Simultaneously, the output from inverter 104 enables NAND circuit 106 to apply the output thereof to the decode circuitry of FIG. 8.

Each pair of sensors of FIG. 12 have two spaced apart sensor elements each providing a signal only one of which is applied to the arrangement of FIG. 14. The output from the second element of each pair is applied to multivibrator 102 in the portion of the switching arrangement shown in FIG. 15. Specifically, the output of multivibrator 102 of FIG. 14 is connected to an input of each of NAND circuits 109 and 110, to the latter via inverter 111. Signals from the second elements of the sensor pairs for tracks I and II are applied to inputs to amplifiers 113 and 114. The outputs of the amplifiers are connected to NAND circuits 109 and 110, respectively. The outputs of the NAND circuits are connected to inputs to NAND circuit 115.

In the first situation where data is present in track II, the output of the multivibrator goes low blocking circuit 109 thus blocking data from track I. Simultaneously, inverter 111 inverts the multivibrator output and enables circuit 110. Thus data from track II is applied to circuit 115. The output of circuit 109 is high thus enabling circuit 115 to apply the data to the decode electronics.

In the second situation where data is not present in track II, the output of multivibrator 102 stays high thus enabling circuit 109 and blocking circuit 110. Enabled circuit 109 applies data from track I to circuit 115. Circuit 110 output is high thus enabling circuit 115 to apply data from track I to the decode electronics.

This first data bit in any encoded track is located at a given (set) point relative to the leading edge of the credit card. Thus, the artifice of offsetting the pair of sensor elements associated with one track with respect to the pair associated with a second track ensures that signals will be generated in the first (encountered) pair. This enables the electronics of FIGS. 14 and 15 to check the data content of one track before the other. If the offset (S of FIG. 12) is one-tenth inch, this is adequate for a card travelling at a typical 25 inches per second. The initial outputs from the separate tracks in this instance are separated by 4 milliseconds, a sufficient time for the switching to be accomplished.

The circuit may be adapted for switching of one of more than two tracks in a straightforward manner. If, for example, a characteristic start code is used for each track, the circuitry may be adapted for sensing two or more tracks (of many) which are encoded. In this instance, data from one track may be stored in a buffer while data from another is processed.

Wear tests indicate that, with continued use, the magnetic tape reduces the thickness of the protective coating on credit card detectors. Consequently, a premium exists for easy-replacement implementations if a typical prior art sensor arrangement is employed where the protective coating extends only over the sensor elements.

Figure 16:
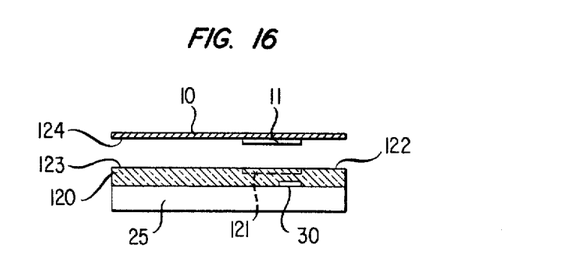

FIG. 16, on the other hand, shows an arrangement which exhibits great resistance to wear. The figure may be visualized as a cross section taken from FIGS. 4 and 5 along element 30 and through card 10 and viewed in the direction of arrow 26 in FIG. 4. The figure shows credit card 10 and tape 11 situated over permalloy sensor element (FIG. 5) 30. Sensor 30 is imbedded in protective coating 120 which wears, with repeated use, to a depth indicated by broken line 121. When coating 120 is worn to this depth, the surfaces 122 and 123 of coating 120 form rails (bearing surfaces) on which the underside 124 of card 10 bears when the card is advanced. Consequently, tape 11 no longer contacts the protective coating and further wear is avoided. Many hundreds of thousands of passes with a credit card are permitted by the structure of FIG. 16.

Figure 17:
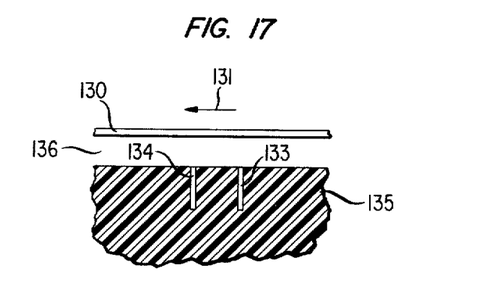
FIG. 17 is a cross-sectional view of an alternative sensor arrangement in accordance with another embodiment of this invention.

For the detection of high density ($\geq 10^3$ bits per inch) tapes, side by side permalloy sensor elements cannot be used. The reason for this is that the minimum thickness of the elements is about 100 angstrom units and the width-to-thickness ratio, dictated by demagnetizing effects which set a minimum stripe width, necessitates an element width of 5 microns for an assumed 20-oersted demagnetizing field. But an alternative geometry shown in FIG. 17 allows decoding of tapes with much greater densities. The figure shows, in cross section, a magnetic tape 130 moving in a direction indicated by arrow 131 and passing sensor elements 133 and 134 imbédded in an insulating substrate 135. In this arrangement, the elements extend into the substrate a distance equal to the width of the tape. Moreover, the separation 136 between the tape and the ends of the elements is kept small to enable the vertical magnetic fields from the tape to have maximum effect on the sensor elements. The elements are deposited layers, separated by deposited insulating layers and can be as little as 100 angstrom units apart, a separation suitable for the detection of the highest density tapes presently available in accordance with the principles of this invention.

The permalloy subelements of FIG. 5 or 12 can be united into an elongated element in each instance so long as the width-to-length ratio ensures a satisfactory shape anisotropy. With these geometries, the common line (ground) usually separates the elements for the separate tracks. In addition, the sensor elements, of FIG. 4, typically extend a distance equal to about the width of a track rather than a distance equal to the width of the credit card as shown.

Although the invention has been described in terms of magnetic tape and magnetoresistive elements the half cell spacing in accordance with this invention is adaptable to nonmagnetic systems such as optically reflective code indications.

What has been described is considered merely illustrative of this invention. Accordingly, various modifications thereof can be devised by those skilled in the art in accordance with those principles still within the spirit and scope of this invention as encompassed by the following claims.

What is claimed is:

1. A sensor for the detection of the presence of characteristic properties of a bit representation in a sequence of bit representations being moved along an axis, each of said representations having a characteristic cell length, said sensor comprising first and second elements operative independently and responsive to each of said bits coupled thereto to provide a signal indicative thereof, said first and second elements being spaced apart along said axis a distance equal to half said cell length.

2. A sensor in accordance with claim 1 wherein said first and second elements are magnetoresistive elements and said bits are defined as regions of magnetic material having magnetization thereof in first and second directions along said axis defining transitions therebetween.

3. A sensor in accordance with claim 2 wherein said first and second elements are thin films of magnetically soft material.

4. A sensor in accordance with claim 3 wherein said bits have a length L normal to said axis and each of said elements comprises a plurality of subelements each having a dimension normal to said axis small compared to L, said subelements being electrically interconnected in series.

5. A sensor in accordance with claim 4 wherein said first and second elements are electrically connected in parallel.

6. A magnetoresistive element for the detection of flux from each of a sequence of magnetic indications, each of said indications having a long dimension L and a cell length C, said element comprising a plurality of subelements each having a rectangular geometry and exhibiting a preferred direction of magnetization, said subelements having dimension small compared to L and being connected electrically in series.

7. First and second magnetoresistive elements in accordance with claim 6 connected electrically in parallel and being spaced apart C/2 astride an axis of movement of said indications.

8. In combination, a parallel arrangement of magnetoresistive elements in accordance with claim 7 and an electronic circuit responsive to the outputs thereof for generating a data stream and a separate clocking signal for that data stream.

9. A combination comprising a parallel arrangement of magnetoresistive elements in accordance with claim 8 wherein said electronic circuit includes means for applying data from said elements to a utilization circuit, said circuit comprising means responsive to successive outputs from said elements for providing alternatively first an enabling pulse and a clock pulse and thereafter disabling said utilization circuit, and means enabled by said enabling pulse for applying an output from said first element to said utilization circuit.

10. A combination in accordance with claim 9 wherein said means for applying data comprises means responsive to simultaneous outputs from both of said first and second elements.

11. A combination in accordance with claim 10 wherein said means responsive to successive outputs from either of said elements provides alternatively an enabling pulse to and thereafter disabling said utilization circuit for intervals determined by the interval between successive outputs.

12. Apparatus for processing data contained on a credit card or the like moved along an axis through said apparatus, said card having a series of spaced apart magnetic indications with a prescribed cell length and extending laterally with respect to said axis, each one of said cells being capable of exhibiting a recorded data bit in the center thereof, first and second magnetoresistive elements extending laterally with respect to said axis astride the path of said data bits, said elements being connected electrically in parallel and being spaced one-half cell apart along said axis.

13. Apparatus comprising first and second sensor elements spaced apart a prescribed distance along an axis and responsive independently to each bit of a coded sequence of bits moved along that axis to generate first and second signals respectively, and an electronic circuit responsive to said first and second signals to generate a data stream and a separate clocking signal, said apparatus including means for applying to said circuit in each instance the second signal which corresponds to the bit of said sequence at said first sensor for providing said data stream and clocking signal, wherein said bits have a characteristic cell length and said last-mentioned means comprises a spacing of one half a cell length between said first and second sensor elements.

14. Apparatus comprising first and second sensor arrangements each of said arrangements including first and second sensor elements in accordance with claim 13, and means for applying the signals from an encoded one of said arrangements to said electronic circuits.

* * * * *

Disclaimer 3,932,731.—*Glenn Ellis Moore, Jr.,* Murray Hill, N.J. CODE CONVERTER. Patent dated Jan. 13, 1976. Disclaimer filed June 15, 1981, by the assignee, *Bell Telephone Laboratories, Inc.*

Hereby enters this disclaimer to claims 1 and 13 of said patent.

[*Official Gazette August 11, 1981.*]